Figure 1:
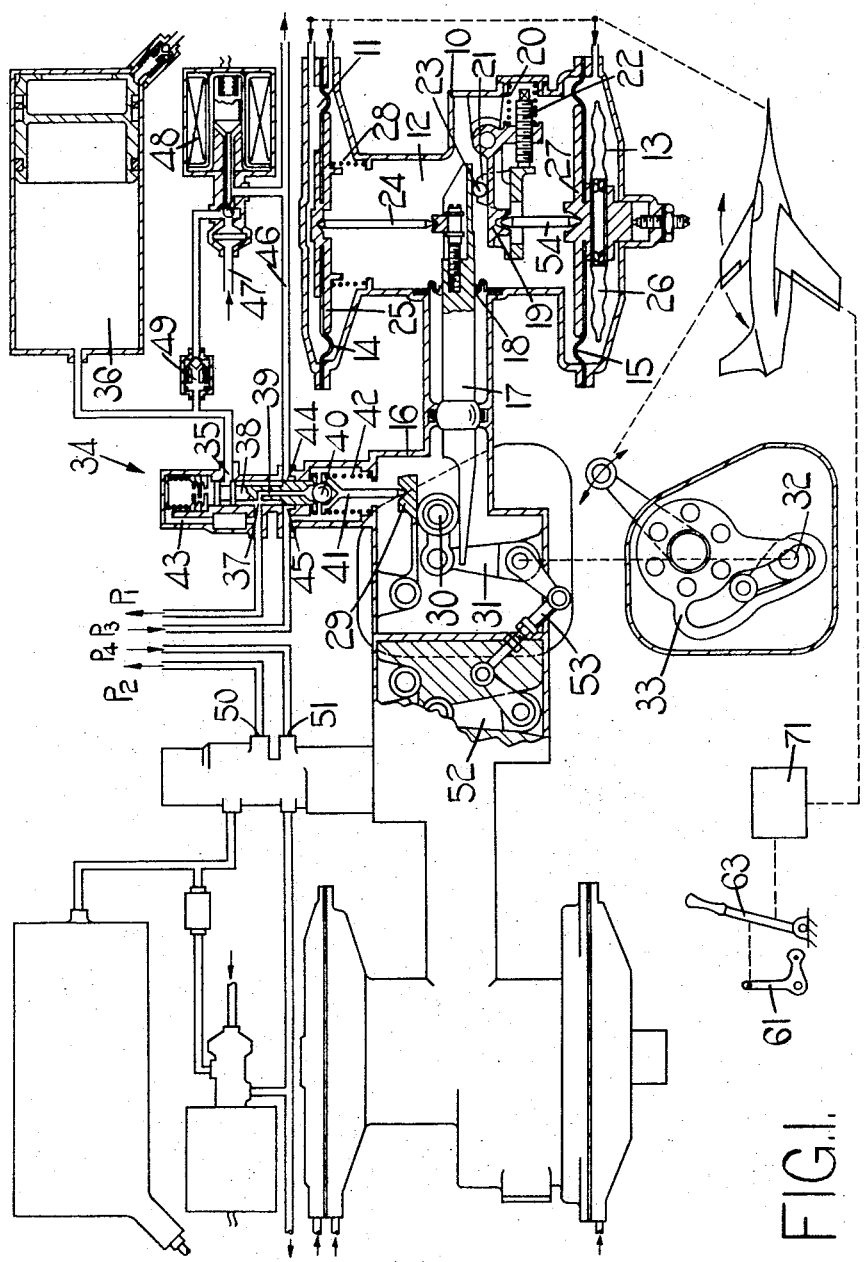

United States Patent [19]

Courtenay et al.

[11] 3,861,065
[45] Jan. 21, 1975

[54] APPARATUS FOR SIMULATING THE EFFECTS OF AERODYNAMIC FORCES ON AIRCRAFT CONTROL

[75] Inventors: Jerzy Leon Courtenay, Varese, Italy; Donald Craven, Wolverhampton, England

[73] Assignee: Lucas Aerospace Ltd., Birmingham, England

[22] Filed: Jan. 8, 1973

[21] Appl. No.: 322,188

[52] U.S. Cl. ............................................... 35/12 W
[51] Int. Cl. ............................................. G09b 9/08
[58] Field of Search ................. 35/12 S, 12 W, 12 R

[56] References Cited
UNITED STATES PATENTS
3,529,365  9/1970  Shelley ........................ 35/12 S
FOREIGN PATENTS OR APPLICATIONS
1,531,518  1/1970  Germany ..................... 35/12 S
1,177,012  8/1964  Germany ..................... 35/12 S

*Primary Examiner*—J. H. Wolff
*Attorney, Agent, or Firm*—Holman & Stern

[57] ABSTRACT

An apparatus for simulating the effects of aerodynamic forces on aircraft controls comprises means for generating first and third pressures, and means for generating second and fourth pressures, the difference between said first and third pressures being normally equal to the difference between said second and fourth pressures. A first and second piston can abut and have the first pressure applied between them and the third pressure applied to their other faces. An output member is movable by the first piston in response to the first pressure. A third piston is subjected to the second and fourth pressures and can coact with the second piston to urge the latter to abut the first piston. In normal conditions output force is derived from said first piston and otherwise from said third piston.

16 Claims, 3 Drawing Figures

3,861,065

APPARATUS FOR SIMULATING THE EFFECTS OF AERODYNAMIC FORCES ON AIRCRAFT CONTROL

This invention relates to apparatus for simulating the effects of aerodynamic forces on aircraft controls.

According to the invention an apparatus for providing, on a manually-operated part of a power-driven control for an aircraft, a simulated effect of aerodynamic forces on the aircraft control surfaces comprises first and second means for generating respective first and second fluid pressures each of which is dependent on pitot and static air pressures on the aircraft, first and second pistons between which said first pressure is applied, an abutment on one of said pistons and engageable with the other of said pistons, a thrust member coacting with said first piston and providing an output for the apparatus, a third piston urged towards said second piston by said second pressure, a passage by means of which a third pressure is applied to the sides of said first and second pistons remote from the first pressure, a further passage by means of which a fourth pressure is applied to the side of said third piston remote from said second pressure, said third and fourth pressures being lower than said first and second pressures respectively, means coacting with said second and third pistons such that movement of said second piston in response to the difference between said first and third pressures is opposed by movement of the third piston in response to the difference between said second and fourth pressure, whereby when the net fluid pressures on the second piston are equal to or greater than the net fluid pressures on the third piston, thrust on the output member is derived from the first piston and in all other conditions said thrust is derived from the third piston.

Figure 2:
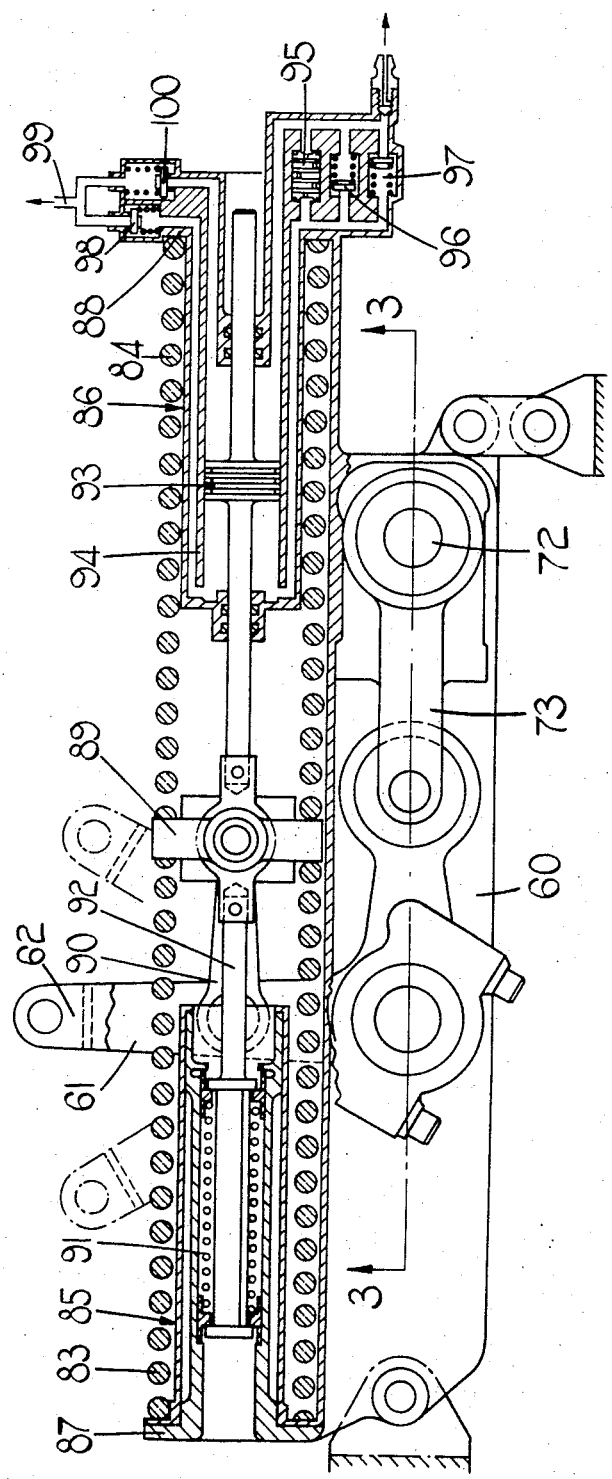
Figure 3:
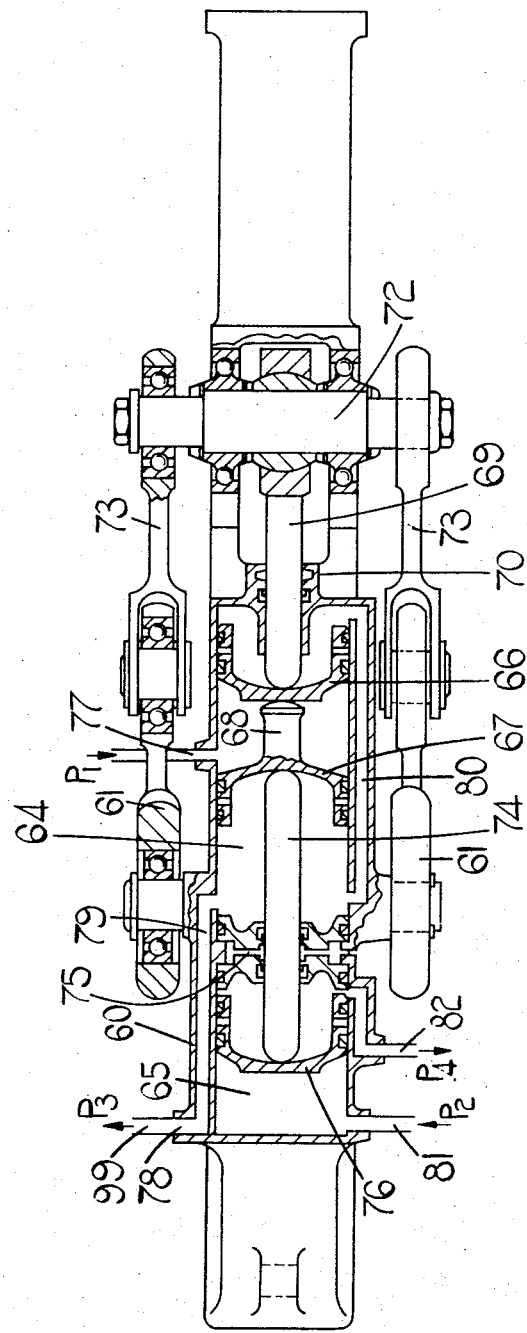

An apparatus according to the invention will now be described by way of example and with reference to the accompanying drawings in which:

FIG. 1 is a diagram of a device for providing pressure signals dependent on aircraft pitot and static pressures, FIG. 2 is an actuator responsive to the pressures provided by the device of FIG. 1, and FIG. 3 is a part section viewed on arrow 3 in FIG. 2.

The device shown in FIG. 1 comprises a pair of substantially identical arrangements, one of which will be described in detail.

A housing 10 is divided into three chambers 11, 12, 13 by diaphragms 14, 15. Chambers 11 and 13 are subjected in use, to the pressure in the pitot-tube of an associated aircraft, and chamber 12 is subjected to the static pressure surrounding the aircraft. Pivotally and sealingly mounted in a wall of a further housing 16 is a lever 17. Lever 17 extends through a flexible seal 18 into the chamber 12.

A lever 19 is pivotally mounted within chamber 12 and is biased towards lever 17 by a spring 20. A cradle 21 is slidable on lever 19 and is adjustable by means of a screw 22. A roller 23 carried by cradle 21 is engaged between levers 17, 19. A push-rod 24 is located between a central plate 25 on diaphragm 14 and lever 17 and a further push rod 54 is located between a plate 27 on diaphragm 15 and lever 19. An evacuated capsule 26 is secured to plate 27 and to housing 10 within chamber 13. A spring 28 biases diaphragm 14 against pressure in chamber 11.

A third lever 29 is pivotally mounted within housing 16. A roller 30 is engaged between lever 29 and the end of lever 17 remote from roller 23. Roller 30 is itself movable with respect to levers 17, 29 by means of an arm 31. Arm 31 is rotatably coupled to a cam follower 32. Cam follower 32 engages a slotted cam 33 whose angular position is dependent on the sweep of the wings of the associated aircraft, which is of the type in which the wing geometry is variable.

A valve arrangement, shown generally at 34 has a pressure inlet port 35 communicating with a reservoir 36, and with a source 47 of fluid pressure. Valve 34 also has a pressure outlet port 37 and a spool-type control member 38 movable to control flow between ports 35, 37. Member 37 includes a passage 39 which communicates with port 37 and opens onto one end of member 38. Passage 39 is normally closed by balo closure member 40 engaged between control member 37 and a stem 41. Stem 41 engages lever 29 and is biased by a spring 42 so as to urge closure member 40 to its shut position and control member 38 towards an open position of valve 34. The pressure at outlet port 37 is applied, via a passage 43 to the end of member 38 remote from ball 40 so as to urge member 38 against spring 42. Valve 34 also has a pair of ports 44, 45 which are permanently interconnected. Reciprocation of member 38 under the influence of spring 42 and the pressure in passage 43 permits port 37 to communicate alternately with port 35 and ports 44, 45. The pressure P1 at port 37 is thus controlled at a value intermediate that at source 47 and the pressure P3 in a low pressure return line 46. A solenoid valve 48 is energizable to connect source 47 to port 35 via a pressurising valve 49, and when de-energised, shuts off source 47.

An identical arrangement has ports 50, 51 for a pressure signal P2 and a return signal P4 respectively, corresponding to the ports 37, 45 in the arrangement described whereby the difference between pressures P1 and P3 is normally equal to the difference between pressures P2 and P4. An arm 52, corresponding to arm 51 is rotatable by cam follower 32 by means of a link rod 53.

The actuator arrangement shown in FIGS. 2 and 3 has a housing 60 on which a bifurcated bell-crank lever 61 is pivoted. Lever 61 is connected at its end 62 to a manually operated part of 63 of a powered control apparatus 71 for the aircraft control surfaces (FIG. 1). Within body 60 are a pair of axially aligned cylinders 64, 65 of equal diameters. Slidable within cylinder 64 are a pair of pistons 66, 67. Piston 67 has an axial boss 68 which is engageable with an abutment on piston 66 to provide a minimum axial spacing between pistons 66, 67. Piston 66 is engageable with a push rod 69 which sealingly extends through an end wall 70 of cylinder 64 and upon which a cross head 72 and the ends of bell crank lever 61 remote from end 62 thereof.

A further push rod 74 sealingly and slidably extends through a wall 75 dividing cylinders 64, 65 and is engageable both by piston 67 and by a third 76 slidable in cylinder 65. A port 77 opens into cylinder 64 between pistons 66, 67 and communicates with pressure P1 via port 37 on the pressure sensitive device shown in FIG. 1. Pressure P3 at 45 on the pressure sensitive device is applied, via a passage 78 and passage 79, 80 with the sides of pistons 66, 67 remote from port 77. Pressures P2 and P4 at ports 50 and 51 respectively on the device of FIG. 1 communicate via passages 81, 82 respectively with opposite sides of piston 76, the pressure P2 at port 50 acting to urge piston 76 towards piston 67.

Mounted on housing 60 are a pair of opposed aligned compression springs 83, 84 which are located by respective guides 85, 86 and end stops 87, 88. Between springs 83, 84 is a cross head 89 coupled to bell crank lever 61 by a link 90. Lever 61 is thus biased to a mid-position by springs 83, 84 are in equilibrium, the force initially required to move lever 61 away from its midposition would normally be very small. There is, however, a further spring 91 within guide 85. A stem 92 engages cross head 89 and extends through spring 9 so that movement of stem 92 in either direction compresses spring 91. The force exerted on lever 61 during, say, clockwise rotation of lever 61, as seen in FIG. 2, is equal to the force exerted by springs 84, 91, less that exerted by spring 83. The dimensions of springs 83, 84 are such that they are fully extended at one third of the maximum movement of lever 61. At this point therefore, the rate of change of force on lever 61 decreases. The same conditions, of course, apply to anti-clockwise movement of lever 61.

Also connected to cross head 89 is a damper piston 93 slidable in a cylinder 94 within spring support 86. Opposite sides of piston 93 are interconnected via a flow restrictor arrangement 95 and by a pair of relief valves 96, 97 adapted to lift during movement in opposite directions of piston 94. Fluid enters the damper cylinder 94 via a non-return valve 98 from a line 99 between passage 78 (FIG. 3) and port 45 (FIG. 1). A thermal relief valve 100 provides for expansion of fluid within cylinder 94.

In use, diaphragm 14 is subjected on opposite sides to the pitot and static air pressures on the aircraft. The resultant force is applied via push rod 24, lever 17, roller 30, lever 29, stem 41 and ball 40 to the valve spool 38, an increase in this force acting to move spool 38 to open port 35, and thereby to cause an increased pressure difference across pistons 66, 67. The other half of the arrangement shown in FIG. 1 behaves identically to cause an increased pressure difference across piston 76, urging piston 76 towards piston 67. In this condition pistons 67, 76 and push rod 74 are in equilibrium, and a force is applied to push rod 69 by piston 66 in accordance with the pressure difference across piston 66.

In the event of failure of pressure P1 at port 77, piston 67 is urged by piston 76 into abutment with piston 66. Force is then applied to push rod 69 by piston 76 in accordance with the pressure across piston 76. This force will be the same as that exerted by piston 66 before failure, since the pressure across pistons 66, 67 and 76 are normally equal. If, during normal operation, the pressure P2 at port 81 fails, this will have no effect on push rod 69, since push rod 69 is normally responsive only to piston 66. A rise in the exhaust pressures P3, P4 in passages 78, 82 has the same effect as a fall in the pressure P1, P2 at the corresponding ports 77, 81.

Valve 34 (FIG. 1) is, in fact, not only responsive to the forces exerted by diaphragm 14, but also to diaphragm 15 and capsule 26. The dimensions of diaphragm 15 and capsule 26 are such that, at lower values of pitot pressure, the pressure on capsule 26 overcomes the pressure difference across diaphragm 15. Diaphragm 15 does not in this condition apply any force to push rod 54 to offset the force on rod 24. At a predetermined ratio of pitot to static pressure, however, the pressure on capsule 26 is overcome and diaphragm 15 lifts. By reason of the advantage in leverage of diaphragm 15 an increase in the pitot/static ratio beyond the predetermined level causes a reversal of the operation of valve 34 and hence of the pressure applied to pistons 66, 67, 76. The Mach. number of the aircraft speed is proportional to the pitot/static ratio, and the above reversal may thus be arranged to occur at a predetermined Mach. number.

Response of valve 34 to pitot and static pressures is also modified by the sweep angle of the aircraft wings, via cam 33 as above described.

It will be understood that the foregoing description of the operation of one half of the device for generating fluid control pressure also applied to the other, identical half.

Movement of control lever 63 either side of a central position pivots bell-crank lever 61 to move cross head 72 against the bias exerted by push rod 69. The force required to move lever 63 is thus dependent on aircraft altitude, speeds and wing position, and thus provides a "feel" which corresponds to the aerodynamic forces on the aircraft.

We claim:

1. An apparatus for providing, on a manually operated part of a power driven control for an aircraft, a simulated effect of aerodynamic forces on the aircraft control surfaces, comprising a pair of means for generating respective first and second fluid pressures each of which is dependent on pitot and static air pressures on the aircraft, a first cylinder, first and second pistons slidable in said first cylinder, means for applying said first pressure to a zone within said first cylinder between said first and second pistons, an abutment on one of said pistons and engageable with the other of said pistons, a thrust member coacting with said first piston and providing an output member for the apparatus, a second cylinder aligned with said first cylinder at an end thereof remote from said first piston, a third piston slidable in said second cylinder, means for applying said second pressure to a side of said third piston remote from said second piston, means for applying a third pressure to the sides of said first and second pistons remote from the first pressure, means for applying a fourth pressure to the side of said third piston remote from said second pressure, means coacting with said second and third pistons such that movement of said second piston in response to said third pressure is opposed by movement of the third piston in response to said second pressure, whereby when said third and fourth pressures are lower than said first and second pressures respectively and the resultant pressure force on the second piston is equal to or greater than the resultant pressure force on the third piston, thrust on the output member is derived from the first piston, and when the resultant pressure force on said third piston is greater than that on said first piston said thrust is derived from the third piston.

2. An apparatus as claimed in claim 1 in which said first, second and third pistons have substantially equal effective areas.

3. An apparatus as claimed in claim 1 in which said first and second pressure generating means are substantially identical and respectively include means connecting said third and fourth pressure-applying means to a low pressure, whereby the difference between said first and third pressures is substantially equal to the difference between said second and fourth pressures.

4. An apparatus as claimed in claim 1 which includes a linkage connecting said thrust member to said manually-operated part of the aircraft control, and a pair of opposed biasing means acting on said linkage to urge the latter to a central, equilibrium position.

5. An apparatus as claimed in claim 4 in which said biasing means are compression springs of substantially equal rate.

6. An apparatus as claimed in claim 5 which includes a third spring acting on said linkage to bias the latter towards said central position.

7. An apparatus as claimed in claim 6, in which said pair of compression springs have substantially equal free lengths and engage said linkage so as to have substantially equal compressed lengths in said central position of said linkage, whereby, when said linkage has moved a predetermined distance from said central position, said thrust member is acted upon only by one of said pair of springs and by said third spring.

8. An apparatus as claimed in claim 4 which includes a damper arrangement coupled to said thrust member by means of said linkage and opposing movement of said thrust member in either direction.

9. An apparatus as claimed in claim 8 in which said damper arrangement comprises a piston and cylinder unit, portions of the cylinder of said unit on opposite saides of the associated piston being interconnected by a flow restrictor.

10. An apparatus as claimed in claim 1 in which said first pressure generating means comprises a fluid pressure source, a return line and a valve responsive to a difference between said pitot and static pressures to provide said first pressure intermediate the pressure at said source and said return line.

11. An apparatus as claimed in claim 10 in which said first pressure generating means includes a housing, a first diaphragm subjected on opposite sides to said pitot and static pressures, a first lever pivotally movable in said housing by said diaphragm, and a control element for said valve, said control element being movable by said lever.

12. An apparatus as claimed in claim 11 in which said first pressure generating means includes a second lever pivotally mounted in said housing and operatively connected to said valve control member and a coupling member engaged between said first and second levers, said coupling member being movable to vary movement of said second lever in response to a given movement of said first lever.

13. An apparatus as claimed in claim 12 which includes a mechanism for moving said coupling member in response to the configuration of variable-geometry wings on said aircraft.

14. An apparatus as claimed in claim 13 in which said mechanism comprises a cam pivotally movable in response to variation of the postions of said wings, and a cam follower linked to said coupling member.

15. An apparatus as claimed in claim 11 in which said first pressure generating means includes a second diaphragm subjected on opposite sides to said pitot and static pressures, a pressure-sensitive device responsive to said pitot pressure and coupled to said second diaphragm so as to oppose movement of the latter in response to an increase in said pitot pressure, a third lever pivotally mounted in the housing and movable by said second diaphragm, and a further coupling element engaging said third and first levers so as to oppose movement of the latter by said first diaphragm, said further coupling element being positioned so as to be able to apply to said first lever a moment which is greater than that applied by said first diaphragm, and the arrangement being such that, below predetermined ratio of pitot to static pressure, the force applied by said pressure-sensitive element exceeds that applied by said second diaphragm, and said first levers thereby operated only by said first diaphragm.

16. An apparatus as claimed in claim 1 in which said first and second means for generating said fluid pressures are substantially identical.

* * * * *